L. R. CARROLL.
POWER TRANSMISSION DEVICE.
APPLICATION FILED FEB. 10, 1916.
1,208,290.
Patented Dec. 12, 1916.
2 SHEETS—SHEET 1.
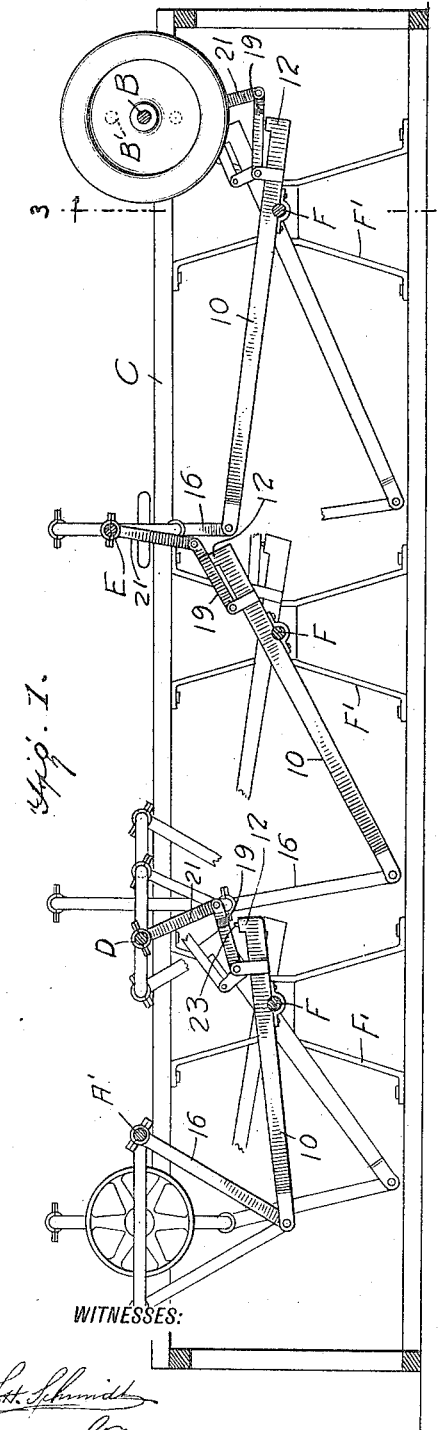
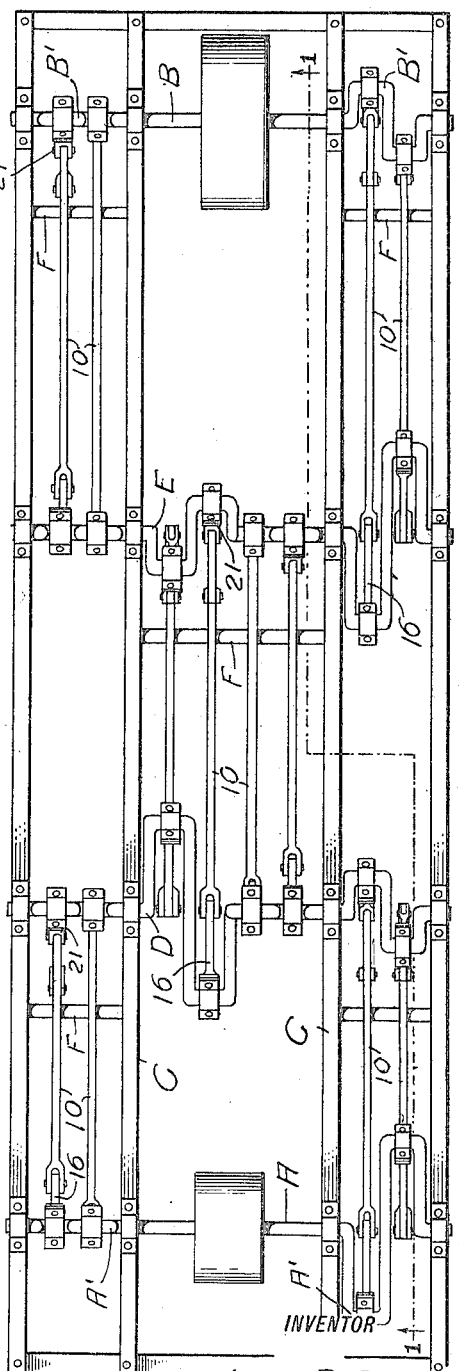
WITNESSES:
INVENTOR
LEWIS R. CARROLL,
BY Munn & Co.
ATTORNEYS L. R. CARROLL.
POWER TRANSMISSION DEVICE.
APPLICATION FILED FEB. 10, 1916.
1,208,290.
Patented Dec. 12, 1916.
2 SHEETS—SHEET 2.
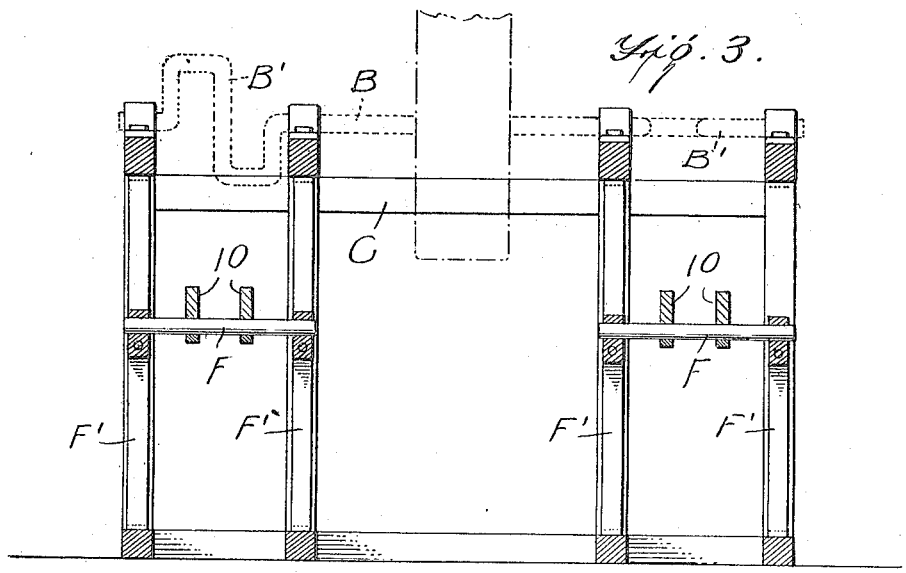
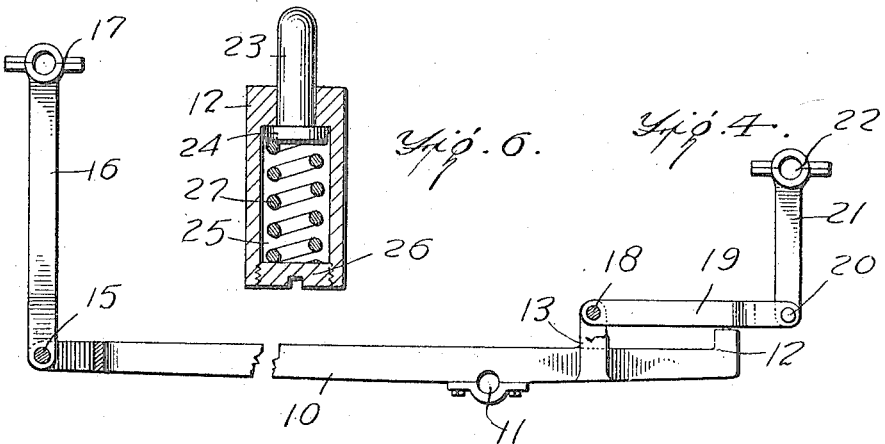
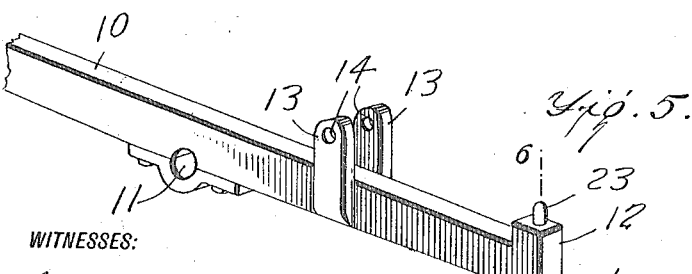
WITNESSES:
INVENTOR
LEWIS R. CARROLL,
BY Munn & Co.
ATTORNEYS

UNITED STATES PATENT OFFICE.

LEWIS RICHARD CARROLL, OF CHARLOTTE, NORTH CAROLINA.

POWER-TRANSMISSION DEVICE.

1,208,290. Specification of Letters Patent. Patented Dec. 12, 1916.

Application filed February 10, 1916. Serial No. 77,464.

*To all whom it may concern:*

Be it known that I, LEWIS RICHARD CARROLL, a citizen of the United States, and a resident of Charlotte, in the county of Mecklenburg and State of North Carolina, have invented a certain new and useful Improvement in Power-Transmission Devices, of which the following is a specification.

My present invention relates generally to power transmission devices, and more particularly to a leverage system of transmitting rotary power from one point to another, and increasing the power in its transmission between such points, my object being to provide a simple, readily constructed, and readily operated means, capable of convenient erection and extension from point to point.

In the accompanying drawings illustrating my invention, Figure 1 is a side elevation illustrating the leverage system applied between driving and driven shafts, through intermediate points and indicating the extension capabilities of the arrangement. Fig. 2 is a plan view thereof. Fig. 3 is a vertical cross section. Fig. 4 is a detail side view of one of the levers with its pitman connection. Fig. 5 is a detail perspective view of one end of the lever shown in Fig. 4, and Fig. 6 is a vertical section through one end of the lever, taken substantially on line 6—6 of Fig. 5.

Referring now to these figures, the transmission system proposed by my invention includes a plurality of levers, one of which is particularly shown in Figs. 4 and 5, this lever 10 like the others, being provided with a bearing 11 adjacent one end by which it may be intermediately fulcrumed, and having at its end nearest the bearing 11 an angular upright extension 12. The lever 10 is also provided with a pair of spaced upright ears 13 apertured as at 14 for a purpose which will be hereinafter described, and is pivotally connected at 15 at its opposite end to a pitman 16 having a bearing 17 at its opposite end.

Pivotally connected at one end to the upstanding ears 13, by means of a pin 18 as shown in Fig. 4, extending through the apertures of the ears, is a link 19, the opposite end of which is pivotally connected at 20 to one end of a pitman 21 having at its opposite end a bearing 22. The link 19 thus overlies the upright extension 12 before mentioned upon one end of the lever 10 and is engaged thereby when the lever is rocked upon its intermediate fulcrum and at a proper time, to exert a thrust movement upon pitman 21 longitudinally thereof.

To the end that the contact between the upright extension 12 and link 19 may take place without undue shock, the said upright extension 12 as particularly seen in Fig. 6, is provided with a longitudinal opening in which a spring-controlled contact pin 23 works, the upper end of this spring projecting above the upper surface of the said extension 12, and the lower end thereof having an enlargement 24 slidable within an enlarged bore 25 of the said extension, communicating with its opening before mentioned, and the lower end of which bore is closed by a screw plug 26. In its movements relative to the extension 12, the contact pin 23 is controlled by a spring 27 located in the bore 25 and seated upon plug 26, and bearing at its upper end against the lower enlargement 24 of the said pin. Thus, upon movement of the extension 12 against the link 19, the latter is initially engaged by the spring controlled contact pin 27, and the shock of contact between these parts is absorbed by the spring 27.

The lever as thus described is capable, with others similarly constructed, of application in various ways, one of which I have endeavored to illustrate in Figs. 1 and 2. In these figures, the driving and driven shafts A and B respectively, are mounted horizontally in parallel relation and at spaced points within a rectangular frame generally indicated at C, the said shaft A having cranks A' upon which the bearings 17 of the several pitmen 16 are connected, and shaft B having cranks B' upon which the bearings 22 of pitmen 21 are connected. As thus mounted, the driving and driven shafts A and B may be directly connected by a single series of the levers 10, although I have in the figures mentioned, shown the connection through intermediate crank shafts D and E, mounted in the frame C parallel with shafts A and B and with one another, and spaced from one another as well as from the said shafts A and B, the crank shaft D receiving the bearings 22 of pitmen 21 of the first series of levers, the pitmen 16 which are connected to the crank shaft A, the shaft E receiving the pitmen 21 of the second series of levers, the pitmen 16 of which are connected to certain cranks of the shaft E, and the driven shaft B receiving the pitmen 21 of the levers of the series whose pitmen 16 are connected to the other cranks of the shaft E. Thus rotation is communicated from the driving shaft A, which may be suitably actuated, through the intermediate shaft to the driven shaft B.

As shown in Fig. 1, the fulcrums of the several levers 10 are formed by transverse shafts F extending through the bearings 11 of the said levers, and supported at their ends by means of brackets F' in the frame C. It is obvious, as before stated, however, that the levers constructed as first described may be applied in various other ways to the same or substantially the same purpose and result in the same, or substantially the same manner.

I claim:—

1. In a power transmission device of the character described, driving and driven shafts having cranks, and leverage connections therebetween including levers each of which is intermediately fulcrumed and provided at one end with an upright extension, and with spaced upstanding ears between its said fulcrum and its said extension, a pitman connecting the opposite end of said lever to a crank of one of said shafts, a link pivotally connected at one end to said ears, and a pitman connecting the opposite end of said link to a crank of the other shaft, the said link overlying the said upright extension of the lever, for the purpose described.

2. In a power transmission device of the character described, driving and driven shafts having cranks, and leverage connections therebetween including levers each of which is intermediately fulcrumed and provided at one end with an upright extension, and with spaced upstanding ears between its said fulcrum and its said extension, a pitman connecting the opposite end of said lever to a crank of one of said shafts, a link pivotally connected at one end to said ears, a pitman connecting the opposite end of said link to a crank of the other shaft, the said link overlying the said upright extension of the lever, for the purpose described, and a spring controlled contact pin carried by the upper end of the said upright extension and initially engageable with the said link when the respective end of the lever is moved upwardly, to absorb the shock of contact between these parts.

3. In a power transmission device of the character described, driving and driven shafts having cranks, and leverage connections therebetween including levers, each of which is intermediately fulcrumed at a point adjacent one end and provided at its said end with an upright extension, a pitman connecting the opposite end of said lever to a crank of one of said shafts, a link pivotally connected at one end to said lever at a point between the fulcrum of the lever and its said upright extension, and overlying the latter, and a pitman connecting the other end of said link to a crank of the other shaft.

4. In a power transmission device of the character described, driving and driven shafts having cranks, and leverage connections therebetween including levers, each of which is intermediately fulcrumed at a point adjacent one end and provided at its said end with an upright extension, a pitman connecting the opposite end of said lever to a crank of one of said shafts, a link pivotally connected at one end to said lever at a point between the fulcrum of the lever and its said upright extension and overlying the latter, and a pitman connecting the other end of said link to a crank of the other shaft, said upright extension having an opening and a bore communicating with the opening, a screw plug closing the lower end of the bore, a vertically depressible pin extending through the said opening, the upper end of which projects exteriorly above the upper end of the said extension, and the lower end of which is provided with an enlargement disposed within the said bore, and a spring also disposed within the bore upon the said screw plug and bearing at its upper end against the lower face of the enlargement of said pin, for the purpose described.

LEWIS RICHARD CARROLL.

Copies of this patent may be obtained for five cents each, by addressing the "Commissioner of Patents, Washington, D. C."